US008724587B2

(12) United States Patent
Wang et al.

(10) Patent No.: US 8,724,587 B2
(45) Date of Patent: May 13, 2014

(54) METHOD, APPARATUS, AND SYSTEM FOR SENDING A DATA PACKET

(75) Inventors: Yan Wang, Beijing (CN); Bo Lin, Beijing (CN); Yuhong Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 13/234,911

(22) Filed: Sep. 16, 2011

(65) Prior Publication Data

US 2012/0008561 A1 Jan. 12, 2012

Related U.S. Application Data

(63) Continuation of application No. PCT/CN2009/070844, filed on Mar. 17, 2009.

(51) Int. Cl.
*H04W 4/00* (2009.01)
*H04W 36/18* (2009.01)
*H04W 52/54* (2009.01)
*H04W 36/00* (2009.01)

(52) U.S. Cl.
CPC .............. *H04W 36/18* (2013.01); *H04W 52/54* (2013.01)
USPC .......................................... 370/331; 455/436

(58) Field of Classification Search
None
See application file for complete search history.

(56) References Cited

U.S. PATENT DOCUMENTS

| 7,957,349 | B2 * | 6/2011 | Kim et al. ................ 370/331 |
| 2007/0226518 | A1 | 9/2007 | Yasaki et al. | |
| 2008/0117877 | A1 | 5/2008 | Min et al. | |
| 2008/0318578 | A1 * | 12/2008 | Worrall .................... 455/437 |
| 2009/0049356 | A1 * | 2/2009 | Lin .......................... 714/749 |
| 2009/0086677 | A1 * | 4/2009 | Ho ........................... 370/331 |
| 2009/0190503 | A1 * | 7/2009 | Tallet et al. .............. 370/256 |
| 2009/0217119 | A1 | 8/2009 | Zhang et al. | |

FOREIGN PATENT DOCUMENTS

| CN | 1949698 A | 4/2007 |
| CN | 1949925 A | 4/2007 |
| CN | 101042720 A | 9/2007 |
| CN | 101043720 A | 9/2007 |
| CN | 101047431 A | 10/2007 |
| CN | 101047967 A | 10/2007 |
| CN | 101146327 A | 3/2008 |
| CN | 101170342 A | 4/2008 |
| CN | 101175304 A | 5/2008 |
| GB | 2 441 166 A | 2/2008 |

(Continued)

OTHER PUBLICATIONS

International Search Report dated Dec. 24, 2009 in connection with International Patent Application No. PCT/CN2009/070844.

(Continued)

*Primary Examiner* — Eunsook Choi

(57) ABSTRACT

The present invention relates to radio communications technologies and discloses a method, an apparatus, and a system for sending a data packet to avoid repeated forwarding of data when a user equipment hands over between an access point and an evolved NodeB. The method includes: receiving, by an evolved NodeB, a data packet sent by a core network and sending the data packet to a current access point; and keeping caching the data packet on the evolved NodeB before determining that a user equipment has correctly received the data packet from the current access point. The present invention is applicable to data transmission in a network.

19 Claims, 4 Drawing Sheets

(56) References Cited

FOREIGN PATENT DOCUMENTS

| RU | 2298289 C2 | 4/2007 |
|---|---|---|
| WO | WO 2008/023814 A2 | 2/2008 |
| WO | WO 2008/041032 A2 | 4/2008 |

OTHER PUBLICATIONS

Written Opinion of the International Searching Authority dated Dec. 24, 2009 in connection with International Patent Application No. PCT/CN2009/070844.
Office Action dated Feb. 26, 2013 in connection with Rusian Patent Application No. 2011141861.
"Lossless/Seamless Intra-LTE Handover", NEC, 3GPP TSG RAN2#56, Nov. 6-10, 2006, 6 pages.
Partial Translation of Office Action dated Mar. 27, 2013 in connection with Chinese Patent Application No. 200980102867.5.
Supplementary European Search Report dated Jan. 31, 2012 in connection with European Patent APplication No. EP 09 84 1695.
Decision on Grant dated Apr. 26, 2013 in connection with Russian Patent Application No. 2011141861/07(062616).
Partial Translation of First Chinese Office Action dated Jul. 5, 2012 in connection with Chinese Patent Application No. 200980102867.5, 11 pages.

* cited by examiner

METHOD, APPARATUS, AND SYSTEM FOR SENDING A DATA PACKET

CROSS-REFERENCE TO RELATED APPLICATIONS

This application is a continuation of International Application No. PCT/CN2009/070844, filed on Mar. 17, 2009, which is hereby incorporated by reference in its entirety.

TECHNICAL FIELD

The present invention relates to radio communications technologies, and in particular, to a method, an apparatus, and a system for sending a data packet.

BACKGROUND

To meet a requirement of IMT-Advanced (International Mobile Telecommunication-Advanced), a next generation radio communications technology of ITU (International Telegraph Union, International Telecommunications Union), 3GPP launches LTE-Advanced, which is an enhanced and evolved version of LTE (Long Term Evolution, Long Term Evolution) that will be finalized soon, in order to meet technical specifications defined by ITU. LTE-Advanced introduces a relay node (Relay Node, RN) to implement functions such as radio network coverage with a high data rate, increasing cell edge throughput and providing new area coverage.

The relay node is connected to an evolved NodeB (eNB) through a radio link. Therefore, a terminal may first be connected to the relay node and then the relay node is connected to the evolved NodeB to realize an air interface of the terminal.

As shown in FIG. 1, after a relay node is introduced, user data is sent from a core network to an evolved NodeB (donor eNB) attached by the relay node, and sent by the evolved NodeB to the relay node, and finally the relay node sends the user data to a user equipment (User Equipment, UE).

For a user equipment that is initially served by the relay node, when the network side instructs the user equipment to hand over to the donor evolved NodeB, according to a handover procedure in a current LTE technology, the relay node may forward downlink data that is cached but not yet sent to the user equipment to the donor evolved NodeB. But the downlink data on the relay node is originally sent by the donor evolved NodeB to the relay node. Therefore, the same data is sent by the donor evolved NodeB to the relay node and then forwarded by the relay node back to the donor evolved NodeB. This causes a waste of a radio link between the relay node and the donor evolved NodeB.

SUMMARY

Embodiments of the present invention provide a method, an apparatus, and a system for sending a data packet to avoid a problem of repeated forwarding of data that is caused in a handover of a user equipment between access points.

Embodiments of the present invention adopt the following technical solutions:

An embodiment of the present invention provides a method for sending a data packet, where the method includes:

receiving, by an evolved NodeB, a data packet sent by a core network and sending the data packet to a current access point; and keeping caching the data packet on the evolved NodeB before determining that a user equipment has correctly received the data packet from the current access point.

An embodiment of the present invention provides another method for sending a data packet, where the method includes:

receiving, by an access point, a data packet sent by an evolved NodeB and sending the data packet to a user equipment; and when determining that the user equipment has correctly received the data packet, sending, by the access point, a response message which indicates that the user equipment has correctly received the data packet to the evolved NodeB to notify the evolved NodeB that it is unnecessary to continue caching the data packet.

An embodiment of the present invention provides an apparatus for sending a data packet, where the apparatus is disposed on an evolved NodeB and includes:

a data forwarding unit, configured to receive a data packet sent by a core network and send the data packet to an access point;

a determining unit, configured to determine that a user equipment has correctly received the data packet from the access point; and a caching unit, configured to cache the data packet before the determining unit determines that the user equipment has correctly received the data packet from the access point.

An embodiment of the present invention provides another apparatus for sending a data packet, where the apparatus is disposed on an access point and includes:

a receiving and forwarding unit, configured to receive a data packet sent by an evolved NodeB and send the data packet to a user equipment; and a responding unit, configured to: after determining that the user equipment has correctly received the data packet, send a response message which indicates that the user equipment has correctly received the data packet to the evolved NodeB to notify the evolved NodeB that it is unnecessary to continue caching the data packet.

An embodiment of the present invention provides a system for sending a data packet, where the system includes:

a first sending apparatus disposed on an evolved NodeB, configured to: receive a data packet sent by a core network and send the data packet to a second sending apparatus; and keep caching the data packet before receiving from the second sending apparatus a response message which indicates that a user equipment has correctly received the data packet; and the second sending apparatus disposed on an access point, configured to: receive the data packet sent by the first sending apparatus and send the data packet to the user equipment; and after receiving a response message that is sent by the user equipment and indicates that the data packet has been correctly received, send a response message which indicates that the user equipment has correctly received the data packet to the first sending apparatus.

With the method, apparatus, and system for sending a data packet according to the embodiments of the present invention, before it is determined that the user equipment has correctly received data packets that are forwarded by the access point, the data packets are cached on the evolved NodeB and may be deleted after it is determined that the user equipment has correctly received the data packets. During sending of the data packets, if the user equipment hands over to the evolved NodeB or another access point, the user equipment can receive the data packets from the evolved NodeB directly or from the evolved NodeB via the access point handed over to. This avoids data forwarding from the original access point of the user equipment to the evolved NodeB and therefore saves network resources.

BRIEF DESCRIPTION OF THE DRAWINGS

To describe the technical solutions in the embodiments of the present invention or in the prior art more clearly, the following briefly describes the accompanying drawings required in the description of the embodiments of the present invention or the prior art. Apparently, the accompanying drawings illustrate only some exemplary embodiments of the present invention and those skilled in the art can derive other drawings from these drawings without creative efforts.

DETAILED DESCRIPTION

A method, an apparatus, and a system for sending a data packet according to the embodiments of the present invention are described in detail below with reference to the accompanying drawings.

It should be noted that the embodiments herein are only some exemplary embodiments of the present invention and not all embodiments of the present invention. Based on the embodiments herein, those skilled in the art can derive other embodiments without creative efforts and such other embodiments all fall within the protection scope of the present invention.

An embodiment of the present invention provides a method for sending a data packet, where the method includes:

an evolved NodeB receives a data packet sent by a core network and sends the data packet to a current access point; and the data packet is kept caching on the evolved NodeB before it is determined that a user equipment has correctly received the data packet from the current access point.

An embodiment of the present invention provides another method for sending a data packet, where the method includes:

an access point receives a data packet sent by an evolved NodeB and sends the data packet to a user equipment; and when determining that the user equipment has correctly received the data packet, the access point sends a response message which indicates that the user equipment has correctly received the data packet to the evolved NodeB to notify the evolved NodeB that it is unnecessary to continue caching the data packet.

By using the methods for sending a data packet according to the embodiments of the present invention, before receiving a response message which indicates that the user equipment has correctly received data packets, the evolved NodeB keeps caching the data packets. Therefore, when the user equipment hands over from the access point to the evolved NodeB or another access point, data packets that are not yet correctly received by the user equipment can be received from the evolved NodeB directly or received from the evolved NodeB via the access point handed over to. The original access point of the user equipment no longer needs to forward the data packets to the evolved NodeB. In this way, network resources are saved.

The following describes specific applications of the methods for sending a data packet according to the embodiments of the present invention in various scenarios. In the embodiments, a user equipment uses a relay node as an access point to get access to a network.

Embodiment 1

This embodiment provides a method for sending a data packet in a Hop by Hop system.

Figure 1:
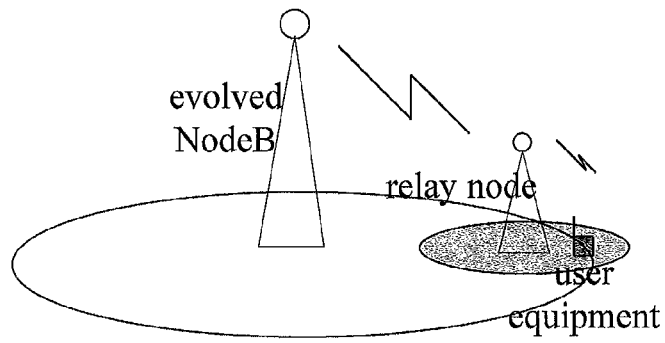
FIG. 1 is a schematic diagram of an LTE network after a relay node is introduced.
Figure 2:
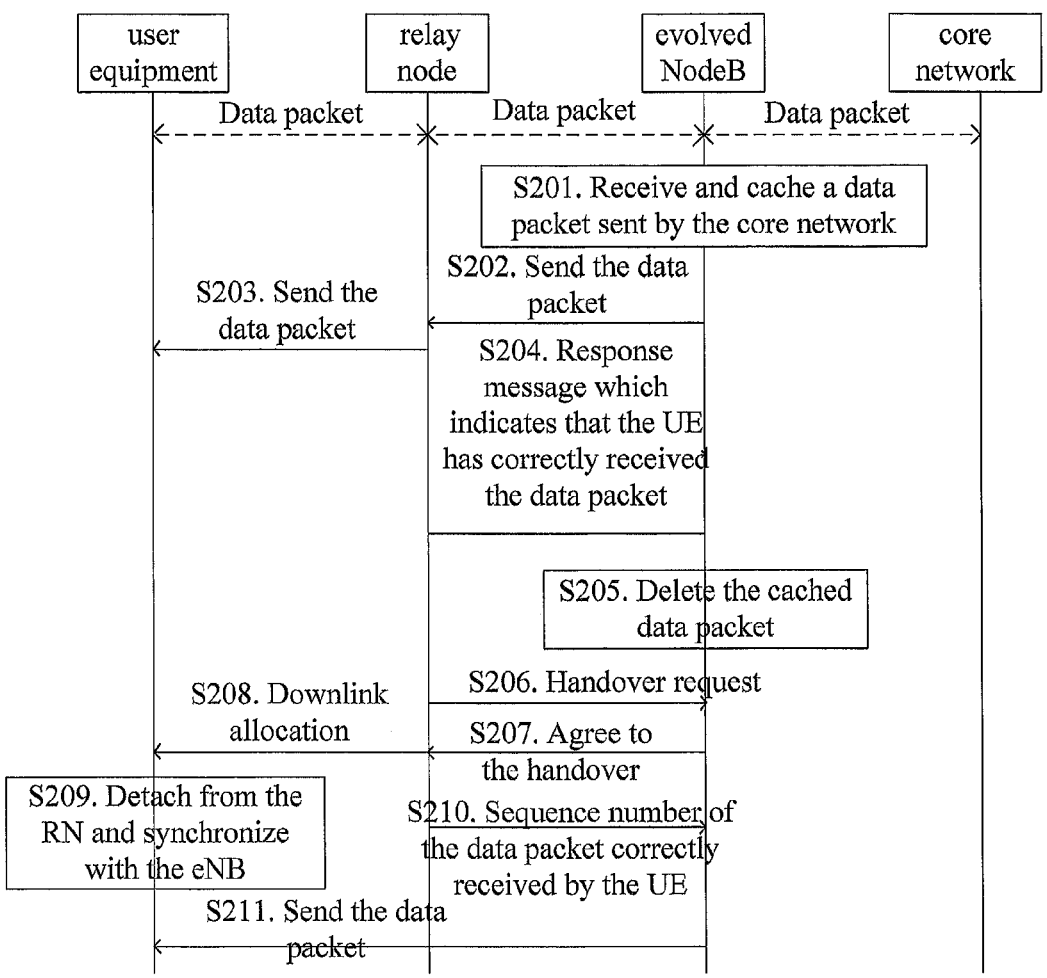
FIG. 2 is a flowchart of a method for sending a data packet according to Embodiment 1 of the present invention.

As shown in FIG. 2, the method according to this embodiment may include the following steps:

S201. An evolved NodeB receives data packets sent by a core network and caches the data packets in a buffer.

In a Hop by Hop system, a data packet buffer is added on the evolved NodeB to cache various data packets such as a PDCP (Packet Data Convergence Protocol), packet, an IP packet, and a service packet.

This buffer is able to cache a large quantity of data packets. These data packets are deleted only after a response message which indicates that a user equipment has correctly received the data packets is received. These data packets are not deleted even if the evolved NodeB has received a response message which indicates that a relay node has correctly received the data packets.

S202. The evolved NodeB sends the received data packet to the relay node.

The relay node is attached to the evolved NodeB and the user equipment gets access to a current network via the relay node.

In a current LTE system, a PDCP-layer packet is transmitted to a peer end through an air interface after being processed at the RLC (Radio Link Control, Radio Link Control), MAC (Media Access Control, Media Access Control), and PHY (Physical) layers. The peer end restores the PDCP packet after PHY-layer, MAC-layer, and RLC-layer processing. A process of segmentation or concatenation may exist during the RLC-layer processing. That is, the RLC layer of a sender combines multiple packets on the PDCP-layer or decomposes one PDCP packet to multiple RLC packets according to some MAC information.

During the sending, if the relay node receives an RLC data packet sending failure message sent by the evolved NodeB, the relay node immediately returns a reception failure message to the evolved NodeB. In this way, upon reception of the response message, the evolved NodeB can immediately retransmit the RLC data packet that fails to be sent.

S203. The relay node sends the received data packet to the user equipment.

S204. The relay node sends a response message which indicates that the user equipment has correctly received the data packet to the evolved NodeB.

The message sent by the relay node to the evolved NodeB may be implemented by adding a message in a current protocol. For example, if the current protocol is an X2 protocol, such a message is added in the current X2 protocol. If the evolved NodeB and the relay node communicate through another protocol, a message is added in that protocol. Or, the response message may be sent as a parameter in an existing message of the current protocol.

The message may include any one item or multiple items of the following: a PDCP packet sequence number, an IP layer data packet sequence number, an application layer data packet sequence number, and an RLC packet sequence number. In this way, which data packets have been correctly received is notified to the evolved NodeB. If the RLC packet sequence number is used, the evolved NodeB can delete a PDCP packet only after it is determined that all RLC packets corresponding to the PDCP packet are received by the user equipment.

The relay node may periodically send the response message which indicates that the user equipment has correctly received a data packet to the evolved NodeB, for example every 10 seconds. Or, the relay node may also send a response message which indicates that the user equipment has correctly received a data packet to the evolved NodeB after the user equipment has correctly received a predetermined quantity of data packets, for example, a message is sent every time the user equipment has received 5,000 data packets.

After receiving the response message, the evolved NodeB knows that it is unnecessary to cache these received data packets and may delete these data packets.

S205. After receiving the response message sent by the relay node, the evolved NodeB deletes the data packets cached in the buffer.

The evolved NodeB knows, according to a PDCP packet sequence number, or an IP layer data packet sequence number, or an application layer data packet sequence number carried in the received response message, which data packets have been correctly received by the user equipment and deletes the corresponding data packets that have been correctly received by the user equipment from the buffer. Whether the data packets in the buffer are immediately deleted may be judged according to an actual condition, provided that these data packets are cached before it is determined that the user equipment has correctly received these data packets. Therefore, this step is optional.

S206. The relay node sends a handover request to the evolved NodeB.

The relay node makes a handover decision according to a measurement result that is reported by the user equipment, requesting a handover of the user equipment to the evolved NodeB. Then, the relay node sends a handover request to the evolved NodeB to hand over the user equipment to the evolved NodeB.

It should be noted that in the embodiment of the present invention, after receiving the handover request from the relay node, the evolved NodeB stops sending a data packet sent by the core network to the relay node.

In this embodiment, the handover request is actively initiated by the relay node. If the request for a handover of the user equipment to the evolved NodeB is actively initiated by the evolved NodeB, after making the handover decision, the evolved NodeB also stops sending a data packet received from the core network to the relay node.

S207. The evolved NodeB agrees to the handover and sends a response message which indicates that the handover is agreed to the relay node.

S208. The relay node sends a downlink allocation request message and an RRC (Radio Resource Control, Radio Resource Control) connection control message to the user equipment.

S209. The user equipment detaches from the relay node and synchronizes with the evolved NodeB.

For steps S207, S208, and S209 which are not described here, refer to the prior art.

S210. The relay node sends information about a sequence number of the data packet that has been currently and correctly received by the user equipment to the evolved NodeB. Then, the relay node releases the used buffer. The information about the sequence number of the data packet that is sent to the evolved NodeB may be a sequence number of a PDCP packet, or a sequence number of an IP layer data packet, or a sequence number of an application layer data packet, or a sequence number of an RLC data packet that has been correctly received by the user equipment.

S211. The evolved NodeB sends a data packet to the user equipment.

Specifically, the evolved NodeB continues to send a data packet that has not been received by the user equipment to the user equipment according to the information about the sequence number of the data packet that has been received by the user equipment.

In this embodiment, the handover request is actively initiated by the relay node. Alternatively, in the embodiment of the present invention, the request for a handover of the user equipment to the evolved NodeB may also be actively initiated by the evolved NodeB. In this case, after the evolved NodeB makes a handover decision, a method similar to that provided by this embodiment may be used to implement the handover.

In this embodiment, a buffer is developed on the evolved NodeB to cache various types of data packets and these data packets are not deleted before it is determined that the user equipment has correctly received these data packets. Therefore, when the user equipment needs to hand over from the relay node to the evolved NodeB, a data packet starting from which data packets need to be transmitted to the user equipment may be determined according to a relay-node-reported sequence number of a data packet that has been correctly received by the user equipment, which avoids resending a data packet that has been sent to the relay node but has not been correctly received by the user equipment to the evolved NodeB. Thereby, the embodiment of the present invention realizes continuity of data or a lossless handover.

The present invention is not limited to the preceding embodiment. A data packet buffer timer may be set on the evolved NodeB to control timed deletion of a data packet. For example, a data packet may be set to be cached in the buffer for 10 seconds and deleted after 10 seconds. Or a counter may also be used, for example, setting a maximum quantity limit. For example, the buffer is set to cache at most 5,000 data packets. A certain quantity of data packets sent at the earliest time may be deleted, for example, an earliest sent packet is deleted every time when a new data packet is cached. By using this method, dynamic deletion is implemented. By using this method, it is also ensured that the evolved NodeB does not delete a data packet that has not been correctly received by the user equipment in a handover process and does not require the relay node to report the information about the sequence number of the data packet that has been correctly received by the user equipment. In this way, network resources are saved and a purpose of the embodiments of the present invention is still achieved. That is, when the user equipment needs to hand over from the relay node to the evolved NodeB, the relay node no longer needs to forward a data packet that has been received by the relay node but has not been received by the user equipment to the evolved NodeB. This method may also be applied to the first embodiment of the present invention. If the relay node fails to send a response message which indicates that the user equipment has correctly received the data packet for a long time, the evolved NodeB may directly determine the data packet that has been correctly received by the user equipment from the relay node by using the preceding timer or counter.

In addition, in this embodiment, with regard to an RLC data packet or a MAC data packet sent by the evolved NodeB, the relay node does not need to send a response message which indicates that the relay node has correctly received the data packet. Because the relay node can send a message which indicates that the user equipment has correctly received the data packet in a timed or quantity-based manner, the response that needs to be sent by the relay node in the prior art is spared and thereby, network resources are saved. Furthermore, in this embodiment, when a data packet is incorrectly transmitted, the data packet can be retransmitted instantly so that the error is prevented from being brought to the next step.

This embodiment is specific to adopting a wireless connection between the evolved NodeB and the relay node. When the evolved NodeB and the relay node adopt a wired connection, the evolved NodeB sends UDP (User Datagram Protocol, user datagram protocol) or IP packets to the relay node through a GTP-U (GPRS Tunneling Protocol-User, GPRS Tunnel Protocol-User) layer. The relay node sends these data packets to the user equipment through the PDCP, RLC, MAC, and PHY layers of the air interface. After receiving these data packets, the user equipment sends a response message about correct reception to the relay node and then the relay node sends a response to the evolved NodeB.

This method may use the solution in this embodiment. The differences are as follows:

(1) The evolved NodeB needs to have a UDP/IP packet buffer or a GTP-U buffer.

(2) The relay node needs to have a mapping table to record a mapping relationship between a PDCP packet and a UDP/IP packet or a mapping relationship between a PDCP packet and a GTP-U packet.

(3) When the relay node sends a response to the evolved NodeB, a sequence number of a UDP/IP or GTP-U packet corresponding to a PDCP packet that is acknowledged by the user equipment is returned.

A method for maintaining the buffer on the evolved NodeB may still be implemented by using the message that is returned by the relay node and indicates that the user equipment has correctly received the data packet (periodical response, event-driven response, and so on) or by using a timer disposed on the evolved NodeB in this embodiment.

Embodiment 2

This embodiment provides a method for sending a data packet in an End to End system.

Figure 3:
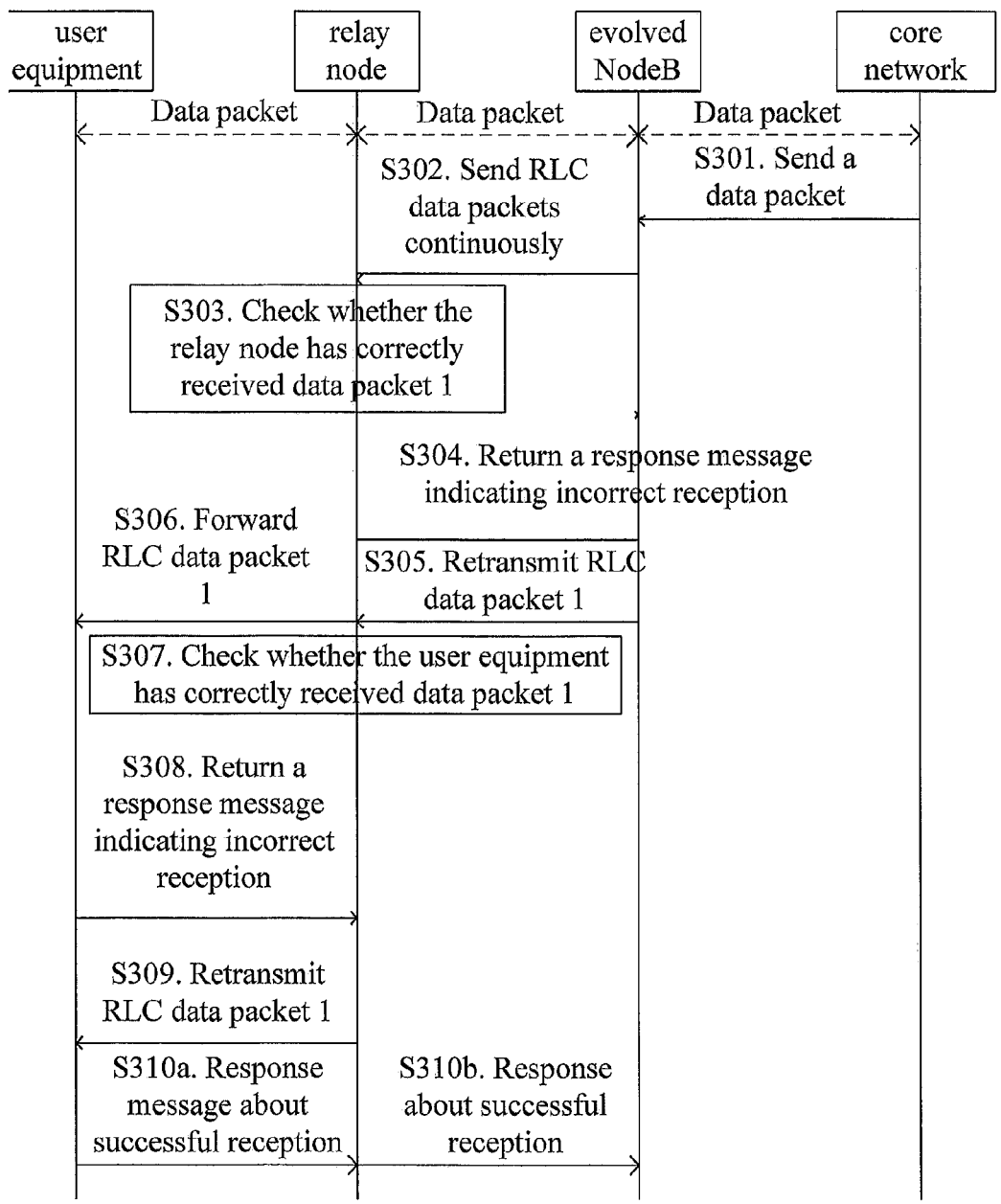
FIG. 3 is a flowchart of a method for sending a data packet according to Embodiment 2 of the present invention.

The embodiment of the present invention is described with reference to a solution illustrated in FIG. 3. The method may include the following steps:

S301. A core network sends a data packet to an evolved NodeB.

S302. The evolved NodeB decomposes the data packet and continuously sends RLC data packets to an relay node, including RLC data packet 1, RLC data packet 2, and so on.

This has been described in Embodiment 1 of the present invention and therefore not described in detail in this embodiment.

The steps of checking whether each RLC data packet has been correctly received by the user equipment are the same. Therefore, only RLC data packet 1 is taken as an example for description. The checking of other packets is alike and not further described.

S303. The relay node checks whether data packet 1 has been correctly received.

If the relay node has correctly received data packet 1, step S306 is performed. It should be noted that the relay node does not send a response message which indicates that data packet 1 has been received to the evolved NodeB. If the relay node has not correctly received data packet 1, step S304 is performed.

S304. The relay node sends a response message which indicates that data packet 1 has not been correctly received to the evolved NodeB S305. The evolved NodeB resends RLC data packet 1 to the relay node.

S306. After determining that the relay node has correctly received data packet 1, the relay node sends the received data packet 1 to the user equipment.

307. The relay node determines whether the user equipment has correctly received data packet 1. If the user equipment has correctly received RLC data packet 1, steps S310a and S310b are performed; if the user equipment has not correctly received RLC data packet 1, step S308 is performed.

S308. If the user equipment has not correctly received data packet 1, the user equipment sends a response message which indicates that data packet 1 has not been correctly received to the relay node.

S309. After receiving the response message which indicates that the user equipment has not correctly received data packet 1, the relay node retransmits RLC data packet 1 to the user equipment.

S310a. After the user equipment has correctly received data packet 1, the user equipment sends a response message about correct reception to the relay node.

S310b. After receiving the response message of the user equipment in step S310a, the relay node sends a response message which indicates that the user equipment has correctly received RLC data packet 1 to the evolved NodeB.

To implement this embodiment, the relay node and the evolved NodeB are required to use the same RLC segmentation policy, so that when a sequence number of an RLC data packet that has been correctly received by the user equipment is returned to the evolved NodeB, the correctly received data packet can match an RLC packet that has not been deleted from the evolved NodeB; or a mapping table is maintained on the relay node, where the mapping table is used to record a mapping relationship of RLC packets between the evolved NodeB and the relay node, or between the relay node and the user equipment, so that the relay node may know a sequence number of the corresponding RLC packet on the evolved NodeB according to the information that is returned by the user equipment and further notify the evolved NodeB of the sequence number. After knowing that all RLC data packets corresponding to one PDCP data packet have been correctly received by the user equipment, the evolved NodeB may delete the PDCP data packet.

The preceding takes only RLC packet 1 as an example. For sending of other RLC data packets, refer to the steps in this embodiment.

According to the steps in this embodiment, the evolved NodeB sends all RLC packets corresponding to one PDCP data packet to the user equipment via the relay node and deletes the PDCP packet only after receiving a response message that is returned by the relay node and indicates that all the RLC packets corresponding to the PDCP packet have been correctly received by the user equipment.

Or, another method may be used. Unlike the preceding embodiment, the relay node does not send a response message about correct reception to the evolved NodeB after RLC data packet 1 has been correctly received by the user equipment, but waits until it is determined that the user equipment has correctly received all RLC packets corresponding to one PDCP packet and then sends all response messages to the evolved NodeB at a time.

There is still another method. The relay node sends a response message about the last RLC packet to the evolved NodeB only after determining that all RLC packets corresponding to one PDCP packet have been correctly received by the user equipment.

If there is no PDCP layer on the relay node, in this embodiment, after the user equipment has correctly received the RLC packets corresponding to one PDCP packet, response messages corresponding to the RLC packets may be sent to the evolved NodeB one by one; or all response messages corresponding to the RLC packets may be sent to the evolved NodeB at a time; or the response message corresponding to the last RLC packet may be sent to the evolved NodeB.

Despite a method used, the evolved NodeB deletes the corresponding data packet only after receiving a message that is sent by the relay node and indicates that the user equipment has correctly received the RLC packets. Therefore, when the user equipment needs to hand over from the relay node to the evolved NodeB, data forwarding from the relay node to the evolved NodeB does not need to be performed and the evolved NodeB can directly uses cached data. In this way, consumption of air interface resources is reduced, delay caused by data forwarding is reduced, and a handover speed is increased. For a solution to the handover of the user equipment to the evolved NodeB or another access point, refer to descriptions in steps S206-S211 in the preceding Embodiment 1.

Therefore, by using the solution, when the user equipment hands over to the evolved NodeB or another access point, the original access point of the user equipment does not need to forward data packets to the evolved NodeB. Furthermore, this solution avoids the delay caused by the fact that in an End to End mode, the next data packet is sent only after a response message which indicates that the user equipment has received the previous data packet is received, which improves efficiency of packet transmission.

If there is no PDCP layer or RLC layer on the relay node, in this embodiment, after the user equipment has correctly received the MAC packets corresponding to one PDCP packet, response messages corresponding to the MAC packets may be sent to the evolved NodeB one by one; or all response messages corresponding to the MAC packets may be sent to the evolved NodeB at a time; or a response message corresponding to the last MAC packet may be to the evolved NodeB.

Embodiment 3

Figure 4:
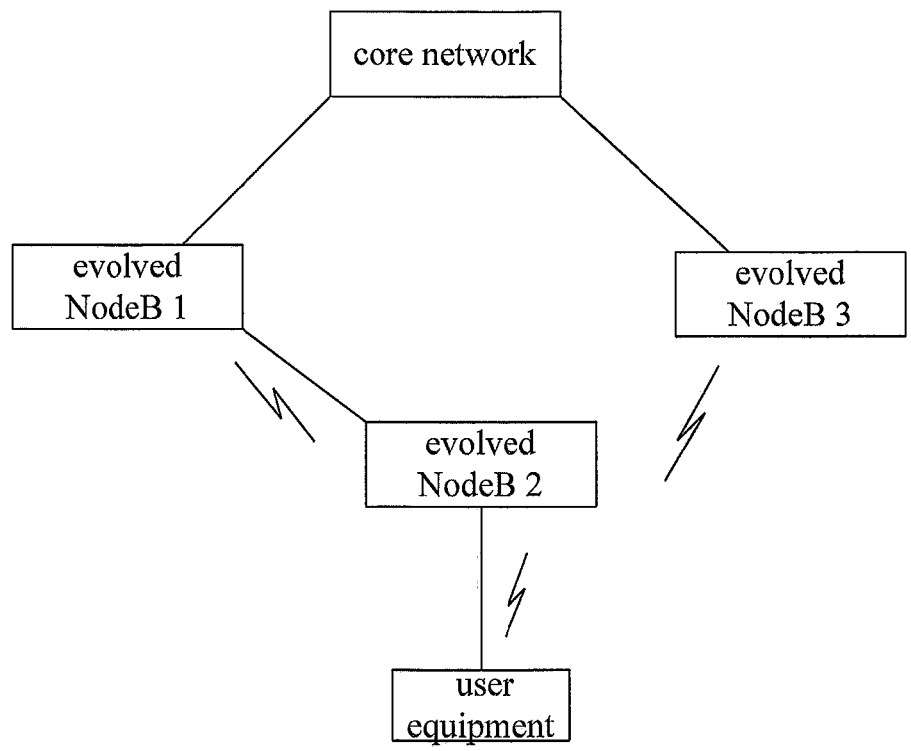
FIG. 4 is a flowchart of a method for sending a data packet according to Embodiment 3 of the present invention.

As shown in FIG. 4, before a handover of a user equipment, a direction of a data packet flow is: core network→evolved NodeB 1→evolved NodeB 2. That is, a data packet is sent to the user equipment by evolved NodeB 2 and through evolved NodeB 1.

Similar to descriptions in the previous embodiment, in this embodiment, data packets sent to the user equipment are cached on evolved NodeB 1 before it is determined that the user equipment has correctly received these cached data packets; and evolved NodeB 1 may delete these data packets only after it is determined that the user equipment has correctly received these cached data packets. That is, if it is not known that the user equipment has correctly received certain downlink data packets, these data packets are always cached on evolved NodeB 1.

When the user equipment needs to hand over to evolved NodeB 1 or another evolved NodeB, for example, evolved NodeB 3, downlink data forwarding from evolved NodeB 2 to evolved NodeB 1, or from evolved NodeB 2 to evolved NodeB 1 and then to evolved NodeB 3, does not need to be performed. Instead, the following method is used to implement the handover:

When the user equipment needs to hand over to evolved NodeB 1, evolved NodeB 1 directly sends a downlink data packet that is not acknowledged by the user equipment to the terminal.

When the user equipment hands over to evolved NodeB 3, evolved NodeB 1 directly forwards a downlink data packet that are not acknowledged by the user equipment to the evolved NodeB 3.

The solution in this embodiment may reduces the data forwarding from evolved NodeB 2 to evolved NodeB 1, speeds up a handover process, and saves network resources.

Embodiment 4

On the basis of the Embodiment 1, in a process of data packet sending, a data transmission mode may be changed according to network quality, including a change from an End to End mode to a Hop by Hop mode, or from the Hop by Hop mode to the End to End mode.

The following describes methods for changing between the two modes.

Method 1

It is assumed that an initial packet transmission mode is Hop by Hop; an evolved NodeB receives a mode change request message initiated by an relay node, where the request message requests a change from the Hop by Hop mode to the End to End mode; and if the evolved NodeB agrees to the change, change to the End to End mode.

A mode change decision may be made according to a network condition. For example, a decision may be made according to a measurement result that is reported by a user equipment, such as signal quality of a network, a signal to noise ratio, or a bit error rate; or a network device itself can make a mode change decision.

The request message may carry a sequence number of a data packet that has been correctly received by the user equipment; or further carry mode change initiation time or a mapping relationship of packet sequence numbers between the evolved NodeB and the relay node. After the change to the End to End mode, because, in the End to End mode, the evolved NodeB does not delete a data packet that are cached by the evolved NodeB before determining that the user equipment has correctly received the data packet, the evolved NodeB may obtain from the request message the sequence number of the data packet that has been correctly received by the user equipment and continue to transmit a data packet from the sequence number, so that the relay node does not need to forward the data packet to the evolved NodeB.

Method 2

On the basis of the mode change described in the preceding Method 1, the data packet transmission mode is changed to the End to End mode. Afterwards, the user equipment hands over from an original access point to the relay node. For the handover method, refer to descriptions in the Embodiment 1 of the present invention. Then, the data packet transmission mode may be changed from the End to End mode back to the Hop by Hop mode.

Specifically, the evolved NodeB initiates a mode change request message to the relay node, where the request message requests a change from the End to End mode to the Hop by Hop mode; after a response message which indicates that the relay node agrees to the change is received, change to the mode specified in the request message. Similar to the description in the preceding Method 1, the request message may carry a sequence number of a data packet that has been correctly received by the user equipment; or further carry mode change initiation time or a mapping relationship of packet sequence numbers between the evolved NodeB and the relay node. After a change to the Hop by Hop mode, the relay node may obtain from the request message the sequence number of the data packet that has been correctly received by the user equipment and continues to send a data packet to the user equipment from the sequence number.

In the preceding Method 1 and Method 2, the mode change request may be initiated by the relay node or the evolved NodeB.

In the Embodiment 4 of the present invention, the data transmission mode is changed according to the network condition, so that an effective transmission mode is provided for data transmission.

In a normal Hop by Hop data packet transmission mode, when knowing that the access point has received a sent data packet, the evolved NodeB deletes the corresponding data packet. This mode may be changed to the Hop by Hop transmission mode described in the Embodiment 1 of the present invention, that is, the evolved NodeB keeps caching a data packet until it is determined that the user equipment has correctly received the data packet. This mode may also be changed to the End to End data packet transmission mode described in the Embodiment 2 of the present invention.

Those skilled in the art may understand that all or part of the steps in the methods provided by the foregoing embodiments of the present invention can be implemented by hardware under the instruction of a computer program. The program may be stored in a computer readable storage medium and when the program is executed, the steps in the methods provided by the foregoing embodiments of the present invention are performed. The storage medium may be a magnetic disk, a Compact Disk-Read Only Memory (CD-ROM), a Read Only Memory (Read Only Memory, ROM), or a Random Access Memory (Random Access Memory, RAM).

Figure 5:
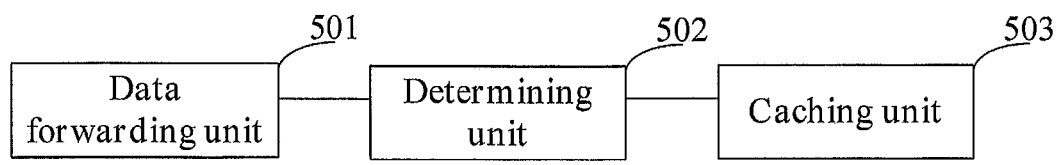
FIG. 5 is a schematic diagram of an apparatus for sending a data packet according to an embodiment of the present invention.

As shown in FIG. 5, an embodiment of the present invention provides an apparatus for sending a data packet, where the apparatus is disposed on an evolved NodeB and includes:

a data forwarding unit 501, configured to receive a data packet sent by a core network and send the data packet to an access point;

a determining unit 502, configured to determine that a user equipment has correctly received the data packet from the access point; and a caching unit 503, configured to cache the data packet before the determining unit determines that the user equipment has correctly received the data packet from the access point.

Further, on the basis of the preceding solution, the determining unit 502 may use multiple methods to determine that the user equipment has correctly received the data packet from the access point. For example, in a first method, the determining unit 502 calculates the transmission time of a data packet and when the transmission time of a data packet reaches a predetermined time, it is determined that the user equipment has correctly received the data packet from the access point and notifies the caching unit 503; or In a Method 2, the determining unit 502 calculates the quantity of data packets cached by the caching unit 503 and when the quantity of the cached data packets reaches a predetermined quantity, determines that the user equipment has correctly received the data packet that is earliest cached by the caching unit 503 from the access point, and notifies the caching unit; or In a Method 3, the determining unit 502 receives a response message sent by the access point periodically or after the user equipment has received a predetermined quantity of data packets, where the response message carries one or any combination of the following items: a packet data convergence protocol PDCP packet sequence number, an IP layer data packet sequence number, an application layer data packet sequence number, and an RLC packet sequence number; and after receiving the response message, determines that the user equipment has correctly received the data packet and notifies the caching unit 503.

In addition, if the third method is used to determine that the user equipment has correctly received the data packet, the third method may be used with the preceding two methods. For example, if the determining unit 502 fails to receive a response message which indicates that the user equipment has correctly received the data packet for a long time, the preceding two methods may be used to make the determination. If it is determined that the user equipment has correctly received the data packet, the acknowledged data packet can be deleted from the caching unit 503.

Figure 6:
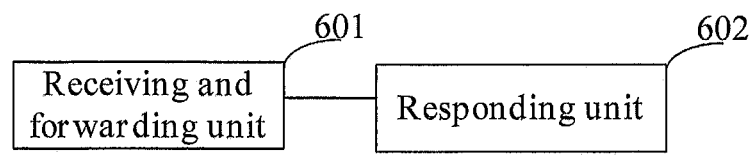
FIG. 6 is a schematic diagram of an apparatus for sending a data packet according to another embodiment of the present invention.
Figure 7:
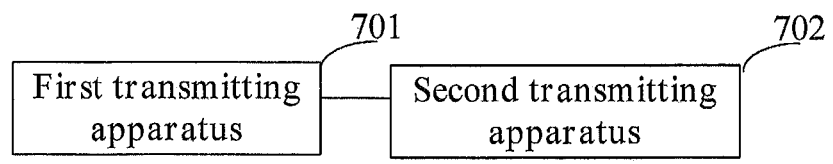
FIG. 7 is a schematic diagram of a system for sending a data packet according to an embodiment of the present invention.

As shown in FIG. 6, an embodiment of the present invention provides another apparatus for sending a data packet, where the apparatus is disposed on an access point and includes:

a receiving and forwarding unit 601, configured to receive a data packet sent by an evolved NodeB and send the data packet to a user equipment; and a responding unit 602, configured to: after determining that the user equipment has correctly received the data packet, send a response message which indicates that the user equipment has correctly received the data packet to the evolved NodeB to notify the evolved NodeB that it is unnecessary to continue caching the data packet.

The response message may be sent to the evolved NodeB periodically or after the user equipment has received a predetermined quantity of data packets. The response message carries one or any combination of the following items: a packet data convergence protocol PDCP packet sequence number, an IP layer data packet sequence number, an application layer data packet sequence number, and an RLC packet sequence number. Therefore, according to the response message, the evolved NodeB knows which data packets have been correctly received by the user equipment, or which data packets no longer need to be cached.

An embodiment of the present invention provides a system for sending a data packet, where the system includes a first sending apparatus 701 and a second sending apparatus 702.

The first sending apparatus 701 is disposed on an evolved NodeB and configured to: receive a data packet sent by a core network and send the data packet to the second sending apparatus 702; and keep caching the data packet before receiving from the second sending apparatus 702 a response message which indicates that the user equipment has correctly received the data packet. The first sending apparatus 701 may be implemented with reference to the apparatus for sending a data packet that is disposed on an evolved NodeB in the preceding embodiment.

The second sending apparatus 702 is disposed on an access point and configured to: receive a data packet sent by the first sending apparatus 702 and send the data packet to the user equipment; and after receiving a response message that is sent by the user equipment and indicates that the data packet have been correctly received, send a response message which indicates that the user equipment has correctly received the data packet to the first sending apparatus. The second sending apparatus 702 may be implemented with reference to the apparatus for sending a data packet that is disposed on an access point in the preceding embodiment.

The apparatuses and system for sending a data packet according to the embodiments of the present invention can implement sending of a data packet with reference to the foregoing embodiments of the methods for sending a data packet and further description is not given.

With the apparatuses and system for sending a data packet according to the embodiments of the present invention, before it is determined that the user equipment has correctly received a data packet, the corresponding data packet is cached on the evolved NodeB. Therefore, when the user equipment hands over from a relay node to an evolved NodeB attached by the relay node or another access point, the relay node does not need to forward a data packet that has been received by the relay node but has not been correctly received by the user equipment to the evolved NodeB. Instead, the user equipment can receive the data packet directly from the evolved NodeB, or receive the data packet from the evolved NodeB via another access point. In this way, network resources are saved.

The preceding describes only exemplary embodiments of the present invention, but the protection scope of the present invention is not limited thereto. Any modification or substitution readily conceivable by those skilled in the art within the scope of technical disclosures of the present invention shall fall within the protection scope of the present invention. Therefore, the protection scope of the present invention is subject to the appended claims.

What is claimed is:

1. A method for sending a data packet, the method comprising:
   receiving, by an evolved NodeB, a data packet sent by a core network and sending the data packet to a current access point;
   keeping caching the data packet on the evolved NodeB before determining that a user equipment has correctly received the data packet from the current access point;
   when the evolved NodeB knows that the user equipment needs to hand over to the evolved NodeB, stopping sending the data packet sent by the core network to the current access point; and
   after the user equipment hands over to the evolved NodeB, receiving, by the evolved NodeB, information about a sequence number of the data packet that has been currently and correctly received by the user equipment, and continuing to send, by the evolved NodeB, a data packet that has not been received by the user equipment to the user equipment according to the information.

2. The method according to claim 1, wherein determining that the user equipment has correctly received the data packet from the current access point comprises:
   when a predetermined time is reached after the data packet is sent, determining that the user equipment has correctly received the data packet from the current access point; or
   keeping a predetermined quantity of data packets in a buffer and determining that the user equipment has correctly received a data packet that is earliest cached in the buffer from the current access point every time a new data packet is cached in the buffer.

3. The method according to claim 1, wherein determining that the user equipment has correctly received the data packet from the current access point comprises:
   receiving a response message sent by the current access point periodically or after the user equipment has received a predetermined quantity of data packets, wherein:
   the response message carries one or any combination of the following items: a Packet Data Convergence Protocol (PDCP) packet sequence number, an IP layer data packet sequence number, an application layer data packet sequence number, and a Radio Link Control (RLC) packet sequence number.

4. The method according to claim 1, wherein the current access point and another access point are relay nodes or evolved NodeBs.

5. A method for sending a data packet, the method comprising:
   receiving, by an evolved NodeB, a data packet sent by a core network and sending the data packet to a current access point;
   keeping caching the data packet on the evolved NodeB before determining that a user equipment has correctly received the data packet from the current access point;
   receiving, by the evolved NodeB, a mode change request message initiated by the current access point, wherein the request message requests a change from a Hop by Hop mode to an End to End mode, and changing to the End to End mode; or
   initiating, by the evolved NodeB, a mode change request message to the current access point, wherein the request message requests a change from the Hop by Hop mode to the End to End mode, and changing to the End to End mode after receiving a response message which indicates that the current access point agrees to the change;
   after the user equipment hands over to a relay node, receiving, by the evolved NodeB, a mode change request message initiated by the relay node, wherein the request message requests a change from an End to End mode to a Hop by Hop mode, and changing to the Hop by Hop mode; or
   initiating, by the evolved NodeB, a mode change request message to the relay node, wherein the request message requests a change from the End to End mode to the Hop by Hop mode, and changing to the Hop by Hop mode after receiving a response message which indicates that the relay node agrees to the change.

6. The method according to claim 5, wherein the request message comprises a sequence number of a sent data packet.

7. The method according to claim 5, wherein the request message comprises a sequence number of a sent data packet, and further comprises mode change initiation time or a mapping relationship of packet sequence numbers between the evolved NodeB and the current access point.

8. A method for sending a data packet, the method comprising:
   receiving, by an access point, a data packet sent by an evolved NodeB and sending the data packet to a user equipment; and
   when determining that the user equipment has correctly received the data packet, sending, by the access point, a response message which indicates that the user equipment has correctly received the data packet to the evolved NodeB to notify the evolved NodeB that it is unnecessary to continue caching the data packet, wherein sending, by the access point, the response message which indicates that the user equipment has correctly received the data packet to the evolved NodeB when determining that the user equipment has correctly received the data packet comprises:

sending, by the access point, a response message to the evolved NodeB periodically or after the user equipment has received a predetermined quantity of data packets, wherein the response message carries one or any combination of the following items: a Packet Data Convergence Protocol (PDCP) packet sequence number, an IP layer data packet sequence number, an application layer data packet sequence number, and a Radio Link Control (RLC) packet sequence number; wherein:

the access point and the evolved NodeB use a same RLC segmentation policy; or a mapping table is maintained on the access point, wherein the mapping table is used to indicate a mapping relationship of RLC packets between the evolved NodeB and the access point, or between the access point and the user equipment.

9. An apparatus for sending a data packet, wherein the apparatus is disposed on an evolved NodeB and comprises:
a data forwarding unit, configured to:
receive a data packet sent by a core network and send the data packet to an access point;
a determining unit, configured to determine that a user equipment has correctly received the data packet from the access point; and
a caching unit, configured to cache the data packet before the determining unit determines that the user equipment has correctly received the data packet from the access point;
wherein in response to knowing that the user equipment needs to hand over to the apparatus, the data forwarding unit is configured to stop sending the data packet sent by the core network to the current access point; and
wherein after the user equipment hands over to the apparatus, the determining unit is configured to receive information about a sequence number of the data packet that has been currently and correctly received by the user equipment, and the data forwarding unit is further configured to continue to send a data packet that has not been received by the user equipment to the user equipment according to the information.

10. The apparatus according to claim 9, wherein the determining unit is configured to: calculate transmission time of a data packet, determine that the user equipment has correctly received the data packet from the access point when the transmission time of the data packet reaches a predetermined time, and notify the caching unit.

11. The apparatus according to claim 9, wherein the determining unit is configured to: calculate a quantity of data packets cached by the caching unit, determine that the user equipment has correctly received a data packet that is earliest cached by the caching unit from the access point when the quantity of cached data packets reaches a predetermined quantity, and notify the caching unit.

12. The apparatus according to claim 9, wherein the determining unit is configured to: receive a response message sent by the access point periodically or after the user equipment has received a predetermined quantity of data packets, wherein the response message carries one or any combination of the following items: a Packet Data Convergence Protocol (PDCP) packet sequence number, an IP layer data packet sequence number, an application layer data packet sequence number, and a Radio Link Control (RLC) packet sequence number; and after receiving the response message, determine that the user equipment has correctly received the data packet and notify the caching unit.

13. An apparatus for sending a data packet, wherein the apparatus is disposed on an access point and comprises:

a receiving and forwarding unit, configured to receive a data packet sent by an evolved NodeB and send the data packet to a user equipment; and a responding unit, configured to: send a response message which indicates that the user equipment has correctly received the data packet to the evolved NodeB to notify the evolved NodeB that it is unnecessary to continue caching the data packet, when determining that the user equipment has correctly received the data packet, wherein the responding unit is further configured to:

send a response message to the evolved NodeB periodically or after the user equipment has received a predetermined quantity of data packets, wherein the response message carries one or any combination of the following items: a Packet Data Convergence Protocol (PDCP) packet sequence number, an IP layer data packet sequence number, an application layer data packet sequence number, and a Radio Link Control (RLC) packet sequence number; wherein:

the access point and the evolved NodeB use a same Radio Link Control (RLC) segmentation policy; or a mapping table is maintained on the access point, wherein the mapping table is used to indicate a mapping relationship of RLC packets between the evolved NodeB and the access point, or between the access point and the user equipment.

14. A system for sending a data packet, comprising:
a first sending apparatus disposed on an evolved NodeB, configured to: receive a data packet sent by a core network and send the data packet to a second sending apparatus; and keep caching the data packet before receiving from the second sending apparatus a response message which indicates that a user equipment has correctly received the data packet, wherein the first sending apparatus is further configured to:
in response to knowing that the user equipment needs to hand over to the first sending apparatus, stop sending the data packet sent by the core network to the second sending apparatus; and
after the user equipment hands over to the first sending apparatus, receive information about a sequence number of the data packet that has been currently and correctly received by the user equipment, and continue to send a data packet that has not been received by the user equipment to the user equipment according to the information; and
the second sending apparatus disposed on an access point, configured to: receive the data packet sent by the first sending apparatus and send the data packet to the user equipment; and after receiving a response message that is sent by the user equipment and that indicates that the data packet has been correctly received, send a response message which indicates that the user equipment has correctly received the data packet to the first sending apparatus.

15. An apparatus for sending a data packet, wherein the apparatus is disposed on an evolved NodeB and comprises:
a data forwarding unit, configured to receive a data packet sent by a core network and send the data packet to an access point;
a determining unit, configured to determine that a user equipment has correctly received the data packet from the access point; and
a caching unit, configured to cache the data packet before the determining unit determines that the user equipment has correctly received the data packet from the access point;

wherein the apparatus is further configured to:
receive a mode change request message initiated by the access point, wherein the request message requests a change from a Hop by Hop mode to an End to End mode, and change to the End to End mode; or
initiate a mode change request message to the access point, wherein the request message requests a change from the Hop by Hop mode to the End to End mode, and change to the End to End mode after receiving a response message which indicates that the access point agrees to the change;
after the user equipment hands over to a relay node, receive a mode change request message initiated by the relay node, wherein the request message requests a change from an End to End mode to a Hop by Hop mode, and change to the Hop by Hop mode; or
initiate a mode change request message to the relay node, wherein the request message requests a change from the End to End mode to the Hop by Hop mode, and change to the Hop by Hop mode after receiving a response message which indicates that the relay node agrees to the change.

16. The apparatus according to claim 15, wherein the request message comprises a sequence number of a sent data packet; or
wherein the request message comprises a sequence number of a sent data packet, and further comprises mode change initiation time or a mapping relationship of packet sequence numbers between the evolved NodeB and the access point.

17. A system for sending a data packet, comprising:
a first sending apparatus disposed on an evolved NodeB, configured to:
receive a data packet sent by a core network and send the data packet to a second sending apparatus;
keep caching the data packet before receiving from the second sending apparatus a response message which indicates that a user equipment has correctly received the data packet;
receive a mode change request message initiated by the second sending apparatus, wherein the request message requests a change from a Hop by Hop mode to an End to End mode, and change to the End to End mode; or
initiate a mode change request message to the second sending apparatus, wherein the request message requests a change from the Hop by Hop mode to the End to End mode, and change to the End to End mode after receiving a response message which indicates that the second sending apparatus agrees to the change;
after the user equipment hands over to a relay node, receive a mode change request message initiated by the relay node, wherein the request message requests a change from an End to End mode to a Hop by Hop mode, and change to the Hop by Hop mode; or
initiate a mode change request message to the relay node, wherein the request message requests a change from the End to End mode to the Hop by Hop mode, and change to the Hop by Hop mode after receiving a response message which indicates that the relay node agrees to the change; and
the second sending apparatus disposed on an access point, configured to:
receive the data packet sent by the first sending apparatus and send the data packet to the user equipment; and
after receiving a response message that is sent by the user equipment that indicates that the data packet has been correctly received, send a response message which indicates that the user equipment has correctly received the data packet to the first sending apparatus.

18. The system according to claim 17, wherein the request message comprises a sequence number of a sent data packet; or
wherein the request message comprises a sequence number of a sent data packet, and further comprises mode change initiation time or a mapping relationship of packet sequence numbers between the evolved NodeB and the access point.

19. A system for sending a data packet, comprising:
a first sending apparatus disposed on an evolved NodeB, configured to:
receive a data packet sent by a core network and send the data packet to a second sending apparatus; and
keep caching the data packet before receiving from the second sending apparatus a response message which indicates that a user equipment has correctly received the data packet; and
the second sending apparatus disposed on an access point, configured to:
receive the data packet sent by the first sending apparatus and send the data packet to the user equipment; and
after receiving a response message that is sent by the user equipment that indicates that the data packet has been correctly received, send a response message which indicates that the user equipment has correctly received the data packet to the first sending apparatus, wherein the second sending apparatus is further configured to:
send a response message to the evolved NodeB periodically or after the user equipment has received a predetermined quantity of data packets,
wherein the response message carries one or any combination of the following items: a Packet Data Convergence Protocol (PDCP) packet sequence number, an IP layer data packet sequence number, an application layer data packet sequence number, and a Radio Link Control (RLC) packet sequence number, and further wherein:
the access point and the evolved NodeB use a same Radio Link Control (RLC) segmentation policy; or
a mapping table is maintained on the access point, wherein the mapping table is used to indicate a mapping relationship of RLC packets between the evolved NodeB and the access point, or between the access point and the user equipment.

* * * * *